US012775169B2

(12) United States Patent
Shuster et al.

(10) Patent No.: US 12,775,169 B2
(45) Date of Patent: Oct. 27, 2026

(54) IMMERSIVE DISPLAYS

(71) Applicants: UTHERVERSE DIGITAL INC, Vancouver (CA); Gregory A. Piccionelli, Vancouver (CA)

(72) Inventors: Brian Shuster, Vancouver (CA); Gregory A. Piccionelli, Westlake Village, CA (US)

( * ) Notice: Subject to any disclaimer, the term of this patent is extended or adjusted under 35 U.S.C. 154(b) by 187 days.

(21) Appl. No.: 17/958,019

(22) Filed: Sep. 30, 2022

(65) Prior Publication Data

US 2023/0028828 A1 Jan. 26, 2023

Related U.S. Application Data

(63) Continuation of application No. 17/220,837, filed on Apr. 1, 2021, now abandoned, which is a continuation of application No. 16/372,073, filed on Apr. 1, 2019, now abandoned, which is a continuation of application No. 14/846,278, filed on Sep. 4, 2015, now Pat. No. 10,248,285.

(60) Provisional application No. 62/048,673, filed on Sep. 10, 2014.

(51) Int. Cl.

| | |
|---|---|
| ***G06F 3/04815*** | (2022.01) |
| ***G02B 27/01*** | (2006.01) |
| ***G06F 3/01*** | (2006.01) |
| ***G06T 11/60*** | (2006.01) |
| ***G06T 19/00*** | (2011.01) |
| *G02B 27/00* | (2006.01) |
| *H04N 13/279* | (2018.01) |

(52) U.S. Cl.
CPC ....... *G06F 3/04815* (2013.01); *G02B 27/017* (2013.01); *G06F 3/011* (2013.01); *G06T 11/60* (2013.01); *G06T 19/006* (2013.01); *G02B 27/0093* (2013.01); *G02B 2027/0138* (2013.01); *G02B 2027/0187* (2013.01); *H04N 13/279* (2018.05); *H04N 2201/3256* (2013.01)

(58) Field of Classification Search
None
See application file for complete search history.

(56) References Cited

U.S. PATENT DOCUMENTS

| | | | | |
|---|---|---|---|---|
| 8,416,083 | B2 * | 4/2013 | Light | H04L 63/20 340/5.1 |
| 2009/0202177 | A1 | 8/2009 | Jeffrey | |
| 2012/0249741 | A1 | 10/2012 | Maciocci et al. | |
| 2013/0031511 | A1 | 1/2013 | Adachi | |
| 2013/0065692 | A1 * | 3/2013 | Aronzon | A63F 13/25 463/43 |
| 2013/0176533 | A1 | 7/2013 | Raffle et al. | |
| 2014/0153900 | A1 | 6/2014 | Tanaka | |
| 2014/0267419 | A1 | 9/2014 | Ballard et al. | |

(Continued)

*Primary Examiner* — Jwalant Amin

(74) *Attorney, Agent, or Firm* — Coleman & Horowitt LLP; Sherrie M. Flynn; Aisha O. Otori

(57) ABSTRACT

A method of displaying images on an immersive display. The method includes receiving information from an external sensor or input device of the immersive display, based on the information received, detecting an object that conflicts with a virtual reality space, adjusting at least one dimension of virtual reality space to provide an adjusted virtual reality for display on the immersive display to accommodate for the object, and displaying the adjusted virtual reality on the display of the immersive display.

9 Claims, 3 Drawing Sheets

(56) References Cited

U.S. PATENT DOCUMENTS

| | | | | |
|---|---|---|---|---|
| 2014/0300547 | A1* | 10/2014 | Hosenpud | G06F 3/011 345/158 |
| 2014/0364212 | A1 | 12/2014 | Osman et al. | |
| 2015/0062120 | A1 | 3/2015 | Reisner-Kollmann et al. | |
| 2015/0070388 | A1* | 3/2015 | Sheaffer | G02B 27/017 345/633 |
| 2015/0221132 | A1 | 8/2015 | Kruglick | |
| 2016/0109940 | A1* | 4/2016 | Lyren | H04W 4/023 463/2 |

* cited by examiner

IMMERSIVE DISPLAYS

CROSS-REFERENCE TO RELATED APPLICATIONS

This application claims priority to and is a continuation of U.S. patent application Ser. No. 17/220,837, filed on Apr. 1, 2021, which is a continuation of U.S. patent application Ser. No. 16/372,073, filed on Apr. 1, 2019, which is a continuation of U.S. patent application Ser. No. 14/846,278, filed on Sep. 4, 2015, (U.S. Pat. No. 10,248,285, issued on Apr. 2, 2019), which claims priority under 35 U.S.C. § 119(e) to provisional application Ser. No. 62/048,673, filed Sep. 10, 2014, which applications are expressly incorporated by reference herein, in their entireties.

FIELD OF TECHNOLOGY

The present disclosure relates to immersive displays such as three-dimensional (3D) displays for displaying virtual or augmented reality environments.

BACKGROUND

Teleconferences and online events such as online meetings, classes, and conferences are useful, particularly in situations where factors such as time, cost, distance, or any combination of these factors make in-person meetings difficult or impractical.

With increasing popularity of immersive displays, applications for such displays are also increasing in number. Applications or uses for immersive displays may involve simulation of real world environments and may include multiple users that utilize immersive displays from various locations. For example, a boardroom or meeting room, a classroom, a conference room or any other room may be simulated for users to attend a virtual meeting or class. Attendees to such meetings, classes, or conferences may be represented by avatars and the attendees may interact with each other by speaking, gesturing, or even writing notes for each other.

Such displays are often head-mounted and in many cases block out some or all of the real environment around the user in order to immerse the user, for example, in the virtual world. The virtual world or augmented-reality is perceived by the user based on images displayed close to the user's eyes.

Improvements in immersive displays and applications or uses of such immersive displays are desirable.

SUMMARY

According to one aspect, a method of displaying images on an immersive display is provided. The method includes receiving information from an external sensor or input device of the immersive display, based on the information received, detecting an object that conflicts with a virtual reality space, adjusting at least one dimension of virtual reality space to provide an adjusted virtual reality for display on the immersive display to accommodate for the object, and displaying the adjusted virtual reality on the display of the immersive display.

BRIEF DESCRIPTION OF THE DRAWINGS

Embodiments of the present disclosure will now be described, by way of example only, with reference to the attached Figures, in which.

DETAILED DESCRIPTION

Figure 1:
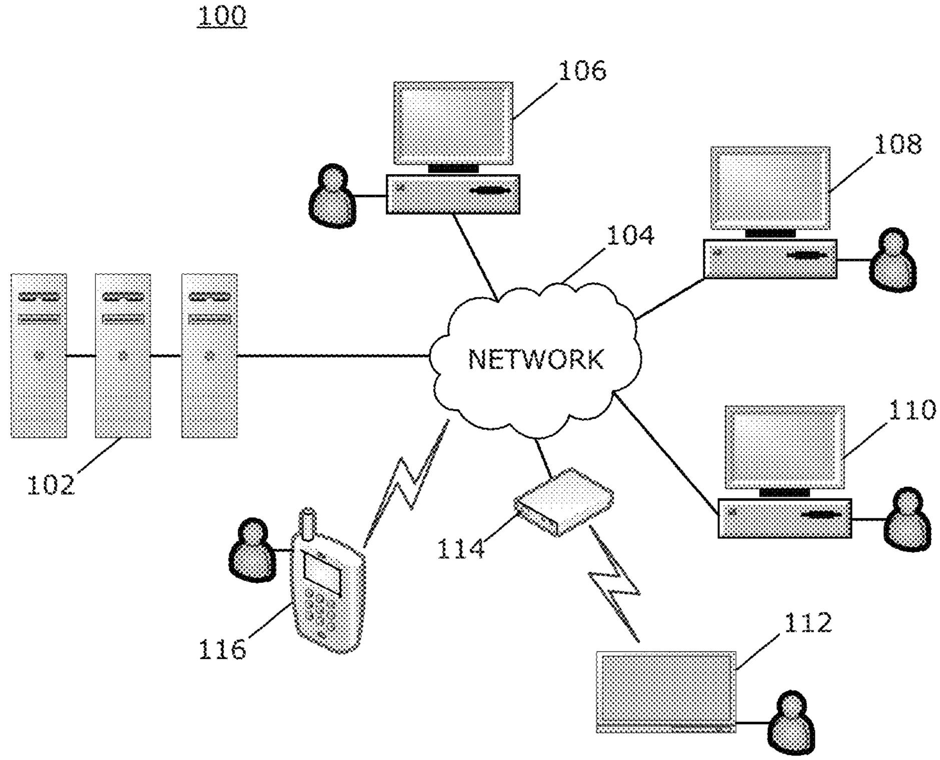
FIG. 1 is a system for providing a multi-user virtual event.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The following describes a system and a method of operating the immersive display. The method includes receiving from an external sensor or input device of the immersive display, based on the information received, detecting an object that conflicts with a virtual reality space, adjusting at least one dimension of virtual reality space to provide an adjusted virtual reality for display on the immersive display to accommodate for the object, and displaying the adjusted virtual reality on the display of the immersive display.

A system 100 for providing a multi-user virtual event is illustrated in FIG. 1. The system includes servers 102 that are coupled to a network 104 or networks, which includes the internet and may optionally include a cellular network through which several client devices, nodes, or terminals may be connected. In the example of FIG. 1, five client devices are coupled to the network 104, including desktop computers 106, 108, 110, a laptop computer 112 which is coupled to the network wirelessly through a modem 114, and a smartphone 116. The servers 102 store and execute software or firmware and communicate and cooperate with software and firmware on the client devices 106, 108, 110, 112, 116 via the network. The software and firmware on the client devices 106, 108, 110, 112, 116 also communicate and cooperate with software and firmware on respective immersive displays that may be worn by the users.

The servers 102, utilizing the software or firmware, provide the virtual environment, which may be a three-dimensional virtual environment, such as a boardroom or meeting room, a classroom, a conference room or any other room or other scene. The virtual environment provided is dependent on the type of event, the number of attendees, and any other suitable factor or factors. An organizer or administrator may also choose from different possible environments.

The servers 102 also manage authorization of users via client devices to facilitate attendance in the virtual environment by avatars representing the users. The avatars enter the virtual environment to attend the event such as a meeting, class, conference or other event.

The images, including the environment, are provided to the client devices 106, 108, 110, 112, 116 for display utilizing the immersive displays, which may be, for example, head-mounted displays worn by the users.

Figure 2:
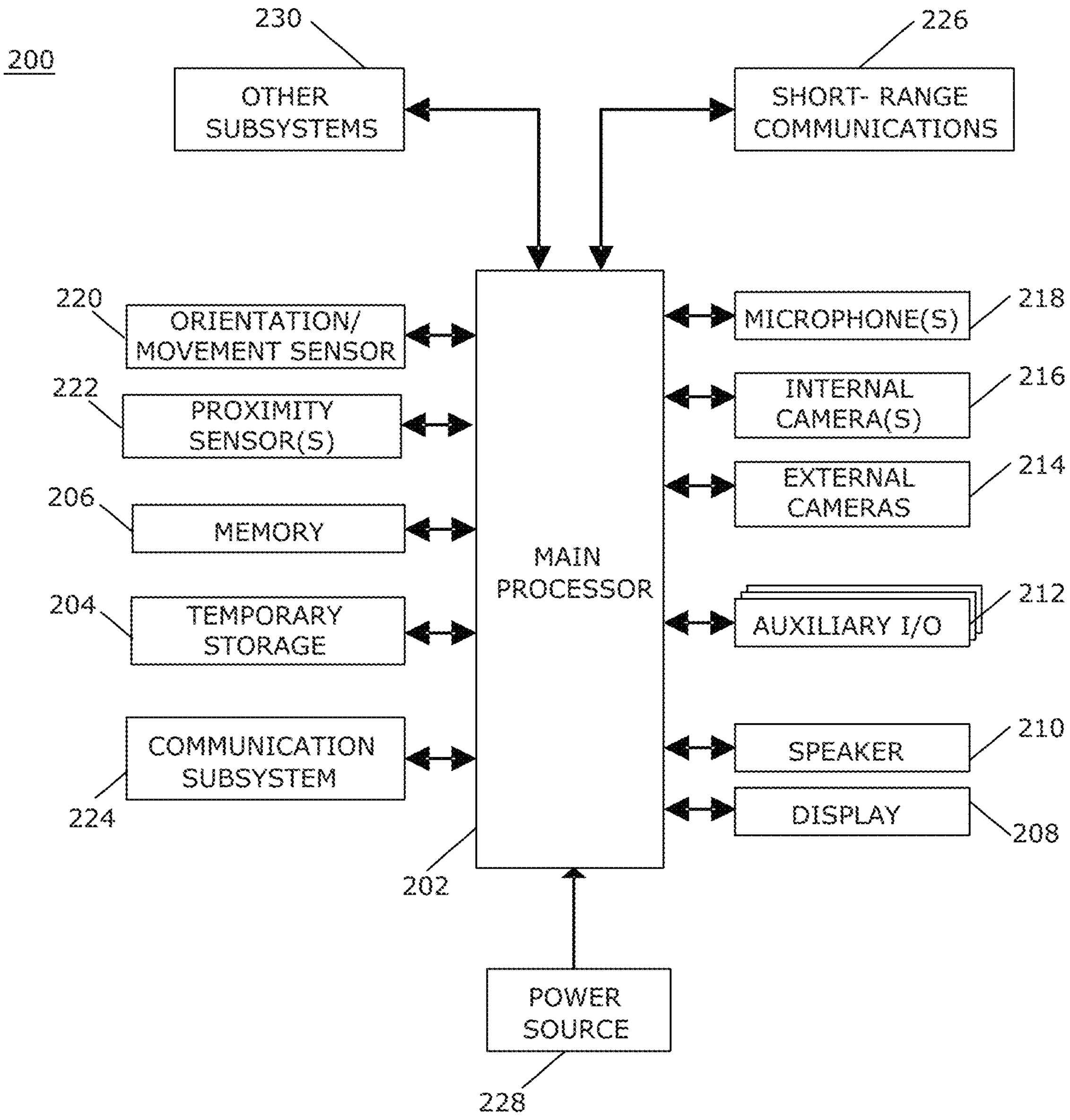
FIG. 2 is a simplified block diagram of an example of an immersive display of the system of FIG. 1.

A simplified block diagram of an example of an immersive display 200 is shown in FIG. 2. The immersive display 200 includes multiple components, such as a main processor 202 that controls the overall operation of the immersive display 200.

The main processor 202 interacts with other components of the immersive display 200, including, for example, a temporary storage device 204, a memory 206, a display device 208, a speaker 210, an auxiliary input/output (I/O) subsystem 212, external cameras 214, one or more internal cameras 216, one or more microphones 218, an orientation/movement sensor 220, one or more proximity sensors 222, a communication subsystem 224, short-range communications 226, a power source 228, and, optionally, other subsystems 230.

The temporary storage device 204 may be, for example, Random Access Memory (RAM) that stores data that is processed by the main processor 202. The memory 204, such as flash memory, is utilized for persistent storage.

The immersive display 200 provides video output through the display 208, which includes an interface, a controller and at least one display to display images. The images displayed may be an image in front of at least one of the user's eyes or may include a respective image in front of each one of the user's eyes. In addition to the display 208, output is provided via the speaker 210 or other audio output such as headphones or earphones. The auxiliary input/output (I/O) subsystem 212 includes an interface through which, for example, a USB controller or other peripheral device may be connected.

Input to the immersive display may be provided via external sensors or input devices such as the external cameras 214 mounted on the body of the immersive display 200. The external cameras 214 may include multiple cameras to obtain images extending around the user, i.e., 360° around the user. The external cameras 214 may also include cameras to obtain images in an upward direction from the user, and in a downward direction from the user. Each of the cameras includes the functional components for operation of the camera, including the lens, the image sensor, and, optionally, a light sensor and light source, such as infrared light emitting diodes (LEDs). Thus, the cameras provide images of the user's environment or surroundings. The cameras may be one or more of visual light cameras, 3D sensing cameras, light field cameras, forward looking infrared cameras, near infrared cameras, ultraviolet cameras, or other imaging devices.

The terms upward and downward are utilized herein to generally describe direction of view of the external cameras 214 relative to the user when the immersive display is worn by the user and the user is in an upright position, and such terms are not otherwise limiting.

The one or more internal cameras 216, referred to herein as the internal camera 216, may be mounted on an inside of the body of the immersive display and includes the functional components for operation of each internal camera, including the lens, the image sensor, and a light source, which may be a light source in the non-visible spectrum, such as infrared LEDs. Although the interior of the immersive display 200 may be dark because exterior light is blocked out or partially blocked out, the light source provides sufficient light for use of the internal camera 216.

The one or more microphones, referred to herein as the microphone 218, may also be mounted in the body of the immersive display 200 to provide input by converting audible information to electrical signals, which may be processed by the main processor 202 and may be transmitted to another electronic device to which the immersive display 200 is coupled. For example, the immersive display may be coupled to a smart-phone, a laptop computer, a tablet, a desktop computer, a game device, and any other suitable electronic device.

The main processor 202 also receives signals from the orientation/movement sensor 220, which is coupled to the body of the immersive display 200. The orientation/movement sensor may be, for example, an accelerometer, a gyro sensor, or any other suitable sensor or combination of sensors that is or are utilized to detect direction of movement, direction of gravitational forces, and reaction forces so as to determine, for example, the orientation of the immersive display 200 and the movement of the immersive display 200.

The one or more proximity sensors, referred to herein as the proximity sensors 222, may provide additional input to the main processor 202 to detect the presence of objects that are near or proximal to the sensor and thus to the user when the immersive display 200 is in use. The proximity sensors 222 may be any suitable proximity sensors such as a capacitive or photoelectric proximity sensor.

The communication subsystem 224 receives signals from another electronic device such as the client devices 106, 108, 110, 112, 116 shown in FIG. 1, and sends signals to the other electronic device to which the immersive display is coupled. Thus, for example, the signals from the microphone 218 or signals from the external cameras 216 or from the internal camera 216 may be sent via the communication subsystem 224. The communication subsystem 224 is also responsible for receiving signals from the other electronic device for processing by the main processor 202 to cause images, which may include video, to be displayed on the display 208 and for audio to be output through the speaker 210.

The immersive display 200 optionally includes short-range communications 226 to perform various communication functions. For example, the immersive display 200 may include Bluetooth or infrared (IR) communications capability, for example, for communicating with a peripheral device or accessory.

The power source 228 may be one or more rechargeable batteries or a port to an external power supply to power the immersive display 200.

The systems and subsystems that interact with the main processor 202 and are described herein are provided as examples only. Other subsystems 230 may also interact with the main processor 202.

Utilizing the images from the internal camera 216, the main processor 202 may be operable to track eye motion. To track eye motion, the user's pupils may be tracked when the immersive display 200 is in use. The eye motion tracking may also facilitate determination of what a user is looking at, for example, by triangulation to determine depth of an object or image that a user is looking at. Alternatively, the internal camera 216 may identify or track changes in muscles or muscle motion around at least one of the user's eyes to identify movement of the eye, or may track changes in shape of a lens of an eye or changes in shape of the lens of each eye to identify a focal distance, facilitating identification of the depth of focus of a user.

Based on the eye motion tracking, the direction of a user's view, or the direction that the user is looking, may be identified. The direction may be, for example, an angle or angles, such as angular offset or offsets from straight ahead. Thus, when a user glances upwardly, downwardly, or to either side, the direction is identified and the images displayed utilizing the display 208 may be changed or adjusted based on the direction.

The main processor 202 is also operable to analyze the images from the internal camera to track or identify a change in facial expression. For example, the main processor 202 may utilize primary facial feature tracking by tracking features such as lips, nose, and eyes. Alternatively, or in addition, movement of parts of the face may be tracked. The main processor 202 may transmit facial expression data or an identification of the expression to the other electronic device to which the immersive display 200 is coupled via the communication subsystem 222.

The main processor 202 is also operable to receive the image data from the external cameras and to transmit the data to the other electronic device, along with metadata for at least key frames for identifying the image data such that the images can be stitched together to provide images of the user's surroundings. Thus, the images from each of the cameras can be stitched together to obtain images of the user's entire surroundings.

Figure 3:
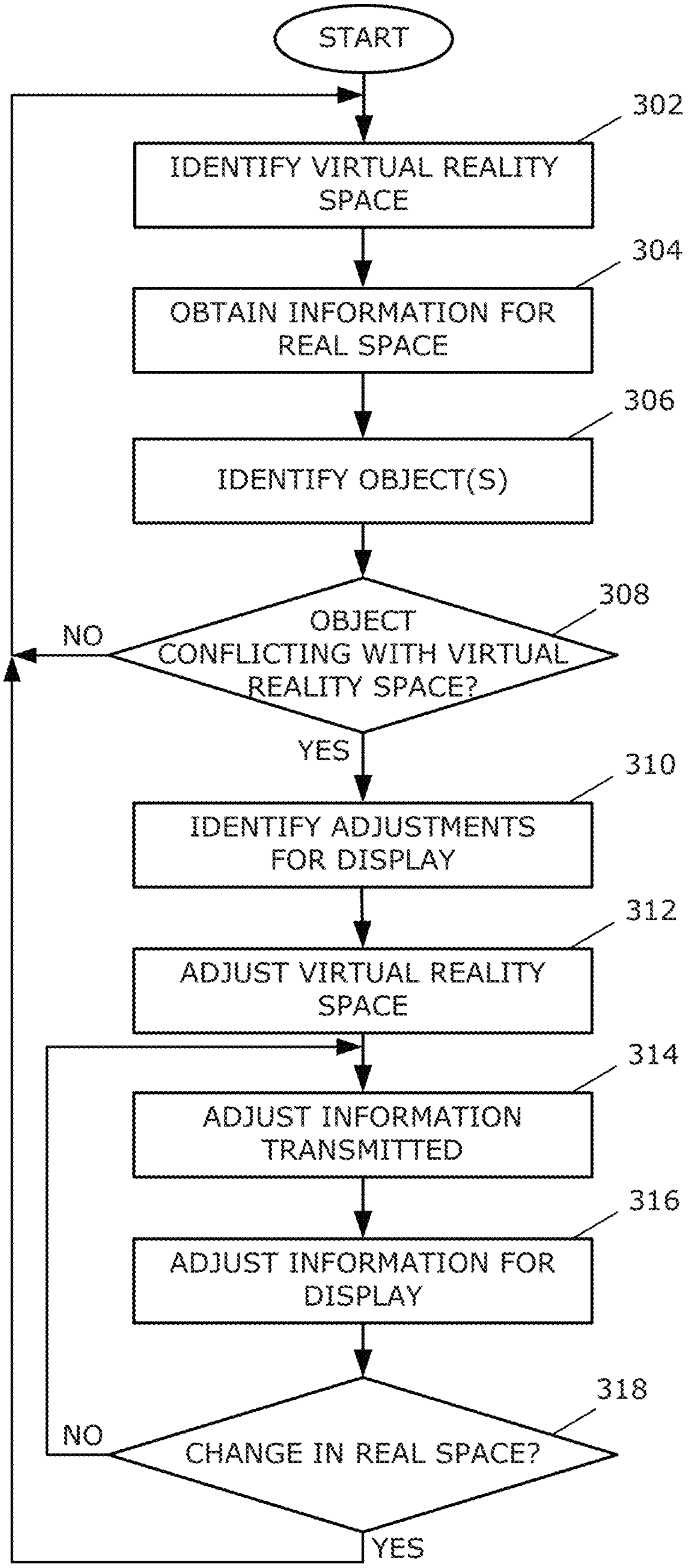
FIG. 3 is a flowchart illustrating an example of a method of displaying images on a display of an immersive display.

A flowchart illustrating a method of displaying images on a display of an immersive display is shown in FIG. 3. The method may be carried out by software executed, for example, by one or more of the servers 102, by one or more of the client devices 106, 108, 110, 112, 116, by the main processor 202 of the immersive display 200, or by a combination of these devices. Coding of software for carrying out such a method is within the scope of a person of ordinary skill in the art given the present description. The method may contain additional or fewer processes than shown and/or described, and may be performed in a different order. Computer-readable code executable by at least one processor to perform the method may be stored in a computer-readable medium, such as a non-transitory computer-readable medium.

A virtual reality space is identified at 302. The virtual reality space may be identified based, at least in part, on a host or user selection via an immersive display 200, or via a client device, such as one of the client devices 106, 108, 110, 112, 116, coupled via the network 104 to the servers 102. The virtual reality space may also be identified 302 based on a type of meeting, conference, class, or other event identified by a host and, for example, a number of invitees to the event.

Information from the exterior of an immersive display 200 is received at 304. The information may be, for example, obtained by the main processor 202 of the immersive display 200 and sent, via one of the client devices 106, 108, 110, 112, 116, to one or more of the servers 102. The information may be information obtained utilizing the external cameras 214 and the proximity sensors 222 of the immersive display 200. Thus, the information may include a location of an object, including distance and direction relative to the immersive display 200.

In addition, to the information obtained using the external cameras 214, and the proximity sensors 222, the information may be information obtained from, for example a peripheral accessory such as a glove, a watch, or a sock that is equipped with a proximity sensor or proximity sensors and is in communication with the immersive display 200 via the short-range communications 226. Thus, gloves, a watch, or socks that may be worn by the user to track movement of the hands or feet of the user may also be utilized to provide proximity information to the main processor 202. The gloves, watch, or socks may also be equipped with haptic feedback devices such as piezoelectric actuators, or vibrational devices to provide the user with feedback based on the locations of the user's hands or feet.

Based on the information obtained, including the images obtained utilizing the external cameras 214 and the information obtained from the proximity sensors 222, objects that conflict with the virtual reality space are identified at 306.

Thus, based on location of an object, including distance of the object from the immersive display 100 or from the peripheral accessory and direction of the object from the immersive display 100 or peripheral accessory, objects that are located in the real environment of the user and that conflict with the virtual reality space identified at 302 are identified at 306. The objects may include objects such as a table, a chair, a wall, stairs, a post or pillar, or any other furniture or structure. The objects may also include, for example, a robotic device, or a dog, a cat, a person, or other living being. Objects in the real environment may conflict with the virtual reality space when, based on the location of the object and based on the virtual reality space, the object would obstruct or inhibit the user from movement within the virtual reality space. For example, an object in a location that would obstruct a user from moving down a hall or path in the virtual reality space or from sitting in a location in the virtual reality space conflicts with the virtual reality space. Thus, predetermined regions in the virtual reality space may be utilized to identify when objects in the real space would interfere or obstruct a user from utilizing the predetermined regions in the virtual reality space.

When no object conflicts with the virtual reality space at 308, the method may continue at 304. Thus, the method may be carried continuously to identify objects that may conflict with the virtual reality space. For example, a user moves in real space, for example, down a hallway or into a new room, objects in the hallway or new room that conflict with the new virtual reality space are identified.

When one or more objects are identified, the method proceeds from 308 to 310. To accommodate for the conflicting objects, adjustments or changes are identified to adjust the virtual reality that is displayed on the local display 208 of the immersive display 200. The adjustments or changes include alterations to the dimensions of the virtual space that is displayed such that the object no longer obstructs the altered virtual space. The alterations are identified by identifying adjustments to dimensions of the virtual reality space such that regions, which may be predetermined regions, for user interaction such as free space intended for a user to walk in or through or intended for a user to sit in, correspond with or matches regions of the real space.

The adjustments that are identified may include a scalar adjustment that is consistent or uniform across a linear dimension or may be adjustments that are non-uniform such that a first portion of a length of a space is adjusted by an amount that differs from a second portion of the length of the space. The adjustments may also differ in each dimension.

For example, an adjustment may be identified to make a table in virtual space larger, such that a table in the virtual space ends where the table in the real space ends. By making the table in virtual space slightly larger, an area at the end of the table in real space may correspond with the area at the end of the table in virtual reality, facilitating use of the space by the user. In another example, adjustments may be identified to make the virtual space slightly smaller to fit the dimensions of a room in real space. According to another example, adjustments may be identified to adjust the dimensions of a doorway in virtual reality to fit the dimensions of a door or hallway in real space.

The images for displaying on the display 208 of the immersive display 200 are adjusted at 312 based on the adjustments identified at 310. The images are adjusted for display on the immersive display 200 from which the information was obtained at 304. Thus, different adjustments may be made for each user attending a meeting, conference, class or other event.

During the event, information that is transmitted from the immersive display 200, via the client devices 106, 108, 110, 112, 116, to one or more of the servers 102 is also adjusted by a reverse or an opposite change at 314. For example, when a user looks at another user's avatar in virtual reality, the line of sight of the user is based on the virtual space images displayed on the user's display. Because the virtual space images are adjusted at 312, the direction that the user is looking, referred to as the direction of view of a user, for example, to look at an avatar of another user, or to look at a virtual element such as a virtual white board or other object, may not match the direction of the avatar or virtual element as displayed on a second user's immersive display. Thus, the direction of view, or direction that a user is looking, is adjusted by a reverse or opposite change to accommodate for changes made to the virtual reality space at 312 such that the second user can see what the first user is looking at. For such an adjustment, the direction that a first user is looking may be identified, for example, based on the direction that the first user is facing and utilizing the internal camera 216 when the immersive display 200 is in use to identify the line of sight. The direction may be, for example, an angle or angles, such as angular offset or offsets from the user. The direction that the user is looking may be transmitted to the servers 102 and the direction is changed by an amount to account for the adjustments made to the virtual reality space of the first user. Thus, a user looking at a speaker in a virtual event, appears to all event participants to be looking at the speaker.

In addition to changes to direction, changes may be made, for example, to distances that a user moves or changes to both direction and distance. Thus, when a user moves to an area at an end of a virtual table, the user's corresponding avatar appears to move to the area at the end of the virtual table for all participants in the event.

In addition to changes to information transmitted from the immersive display 200, information that is sent to the immersive display 200 is adjusted at 316 such that the information that is sent to the immersive display is changed to accommodate for the changes made to the virtual reality space. For example, the direction of view of other participants may be adjusted such that another participant looking at the speaker appears to the user of the immersive display 200 for which adjustments were made to the virtual reality space at 312, to be looking at the speaker. Similarly, other directions and distances may also be changed at 316 to accommodate for changes that are made to the virtual reality space at 312.

When a change in the real space is detected based on information received from the immersive display 200 at 318, the process continues at 302. Thus, when a user moves to a different location or when a change occurs in the room in which a user is located, the process continues at 302.

In one example, a user is one of four participants attending a virtual brainstorming event. A virtual boardroom is identified at 302 based on a host participant's selection and information regarding the real environment is obtained at 304 utilizing the external cameras 214 and the proximity sensors 222. For the purpose of the present example, a pillar conflicts with the virtual reality space because the pillar is located in front of a virtual white board utilized in the virtual event. Absent an adjustment, the pillar would obstruct the user from writing on the left side of the white board. The pillar is identified at 306 and the process continues from 308 to 310 where adjustments are identified. An adjustment is identified at 310 in order to shift the virtual white board to the right such that the pillar does not obstruct the user from writing on the left side of the white board. The adjustment is applied at 312 and the virtual white board is shifted to the right for only the user of the immersive display 200 in the room in which the pillar is located. Other participants may be unaware of the shift or adjustments made to the virtual reality space for the user. Information transmitted from the immersive display 200 is adjusted at 314 to accommodate for changes made to the virtual reality space for the user. For example, when the user points to an element such as a drawing or part of a drawing on the virtual white board, the direction that the user's avatar points to is changed at 314 for other participants such that the other participants can see and identify what the user is attempting to point to. Similarly when another participant points to an element on the virtual white board, the direction is adjusted at 316 for display on the user's display 208.

The described embodiments are to be considered as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. A method of displaying images on a display of an immersive display, the method comprising:

receiving virtual reality location data from a first participant in a virtual multi-user event, where the virtual reality location data comprises one or more of: (a) a location of the first participant within the virtual multi-user event; (b) dimensions within the first participant's view of the virtual multi-user event; (c) a view direction in which the first participant is looking within the virtual multi-user event; and (d) a location of one or more objects within the virtual multi-user event;

determining at least one object at which the first participant is looking;

determining whether the at least one object at which the first participant is looking is obstructed when viewed from the location of the second participant by the one or more virtual objects;

in response to determining that the at least one object at which the first participant is looking is obstructed when viewed from the location of the second participant by the one or more obscuring virtual objects, adjusting one or more of the dimensions of virtual reality space for the second participant as used for display on the immersive display in a manner that causes the one or more obscuring virtual objects to no longer be in the line of sight of the at least one object as viewed from the location of the second participant.

2. The method of claim 1, where for the first participant, one or more of the dimensions of the virtual reality space are also adjusted.

3. The method of claim 2, where dimensions adjustment information is sent to the first participant and the dimensions for the first participant are adjusted so the first participant appears to be interacting with the at least one object at a location closer to the location at which the at least one object is displayed for the second participant.

4. The method of claim 1, where the first participant points to the at least one object, and a direction of the pointing is modified for the second participant so that both the first participant and the second participant see the pointing as directed to the same at least one object, where a location of the at least one object as seen by the first participant and a location at which the at least one object is displayed for the second participant are not the same.

5. A method of displaying images on a display of an immersive display, the method comprising:

receiving virtual reality location data from a first participant in a virtual multi-user event, where the virtual reality location data comprises an object with which the first participant is interacting;

determining whether the object with which the first participant is interacting is obstructed by another object when viewed from a second participant's point of view or line of sight;

in response to determining that the object with which the first participant is interacting is obstructed, adjusting one or more dimensions of virtual reality space that the second participant is viewing from so that the object with which the first participant is interacting is no longer obstructed from the second participant's view.

6. The method of claim 5, where adjusting the one or more dimensions of the virtual reality space that the second participant is viewing from comprises utilizing a dimension from the object to the other object as seen from a perspective of the first participant.

7. The method of claim 5, where adjusting the one or more dimensions of the virtual reality space that the second participant is viewing from comprises resizing space occupied by the object so that the object is visible along the second participant's line of sight largely matching a place where it is visible to the first participant.

8. The method of claim 5, where adjusting the one or more dimensions of the virtual reality space that the second participant is viewing from comprises adjusting the dimensions such that space occupied by the other object is resized so that the first participant's object is not obstructed from the second participant's view when the same dimensional adjustment is applied to the first participant.

9. The method of claim 8, where the adjusting the one or more dimensions of the virtual reality space that the second participant is viewing from includes adjusting at least one dimension of the other object to remove the obstruction.

* * * * *